July 13, 1926.  1,592,803
J. F. WOLANIN
COLLAPSIBLE CRATE
Filed April 28, 1925    2 Sheets-Sheet 1

Joseph F. Wolanin
INVENTOR
BY
ATTORNEY

July 13, 1926.  
J. F. WOLANIN  
COLLAPSIBLE CRATE  
Filed April 28, 1925  
1,592,803  
2 Sheets-Sheet 2

Joseph F. Wolanin
INVENTOR

Patented July 13, 1926.

1,592,803

UNITED STATES PATENT OFFICE.

JOSEPH F. WOLANIN, OF NORTH DETROIT, MICHIGAN.

COLLAPSIBLE CRATE.

Application filed April 28, 1925. Serial No. 26,493.

This invention relates to shipping crates especially adapted for poultry and has for an object the provision of a crate of this character which may be easily and quickly folded or collapsed so as to occupy a minimum amount of space in storage or shipment, and may be quickly and easily set up for use.

Another object of the invention is the provision of a crate of this character which when folded or collapsed will be securely held in such position and when set up or extended will have its walls so associated as to provide a strong crate structure in which relative accidental movement of the walls will be prevented, so that the crates may be packed one upon the other without danger of collapsing.

A further object of the invention is the provision of a poultry crate which may be conveniently kept in a sanitary condition, means being provided to permit of the removal of the bottom of the crate so that the latter may be thoroughly cleaned and replaced either when the crate is in use, or when it is empty.

A still further object of the invention is the provision of a crate of this character which is simple and durable in construction and which is provided with convenient means for placing fowls therein or removing them from the crate.

With the above and other objects in view, the invention further includes the following novel features and details of construction, to be hereinafter more fully described, illustrated in the accompanying drawings and pointed out in the appended claims.

In the drawings:—

Figure 1:
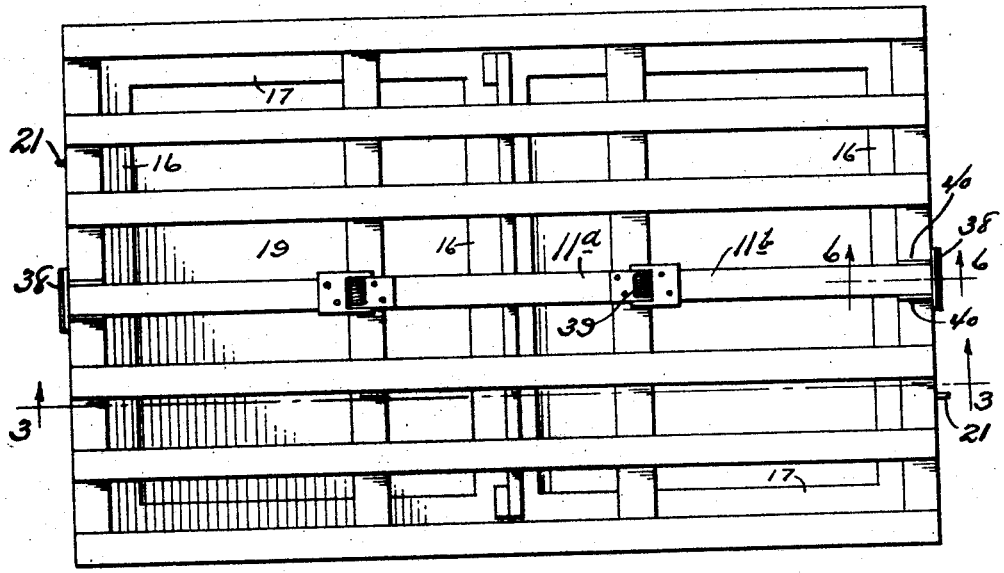
Figure 1 is a top plan view of a crate constructed in accordance with the invention.
Figure 2:
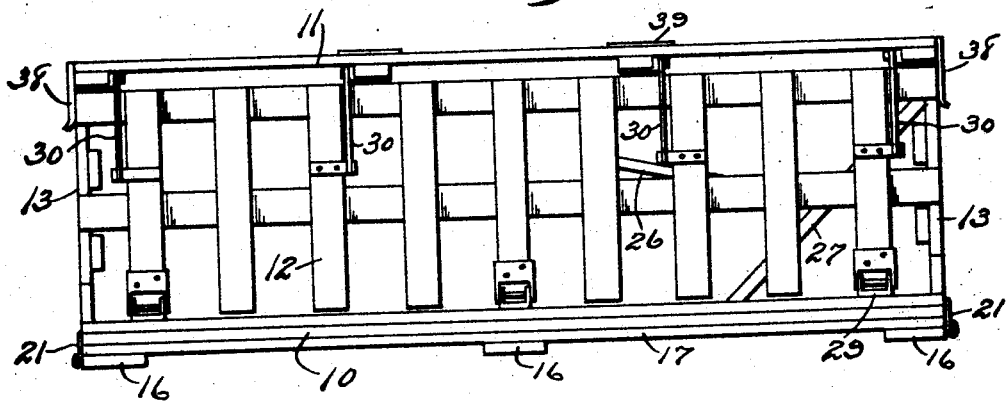
Figure 2 is a side view of the same.

Referring to the drawings in detail wherein like characters of reference denote corresponding parts, the crate as shown comprises a bottom 10, a top 11, side walls 12 and end walls 13, while a transversely arranged partition wall 14 is preferably located between the end walls 13.

Figure 3:
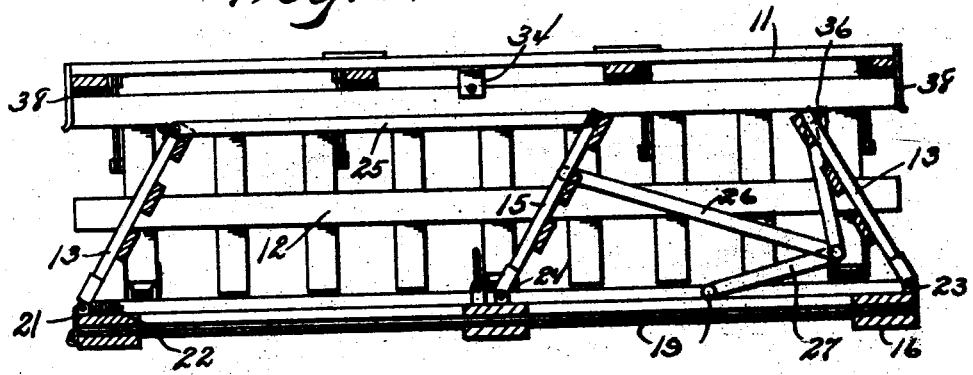
Figure 3 is a view taken substantially on the line 3—3 of Figure 1 showing the end walls and the partition wall partly collapsed.
Figure 4:
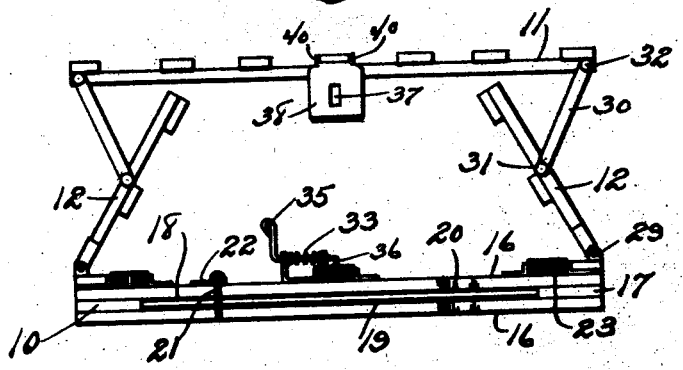
Figure 4 is an end view with the end walls folded and the side walls partly collapsed.
Figure 5:
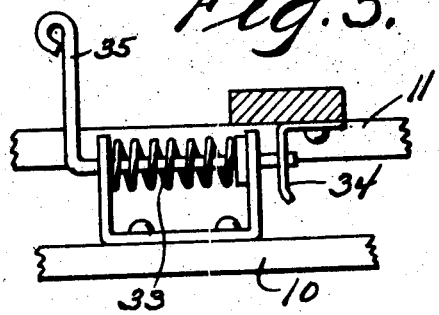
Figure 5 is an enlarged fragmentary sectional view illustrating the means for holding the crate folded.
Figure 6:
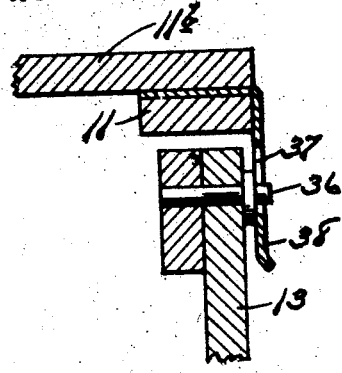
Figure 6 is an enlarged fragmentary sectional view taken substantially on the line 6—6 of Figure 1.

The bottom of the crate is of novel construction and comprises spaced pairs of transversely arranged bars 16 which are spaced apart and which are connected by longitudinally disposed end bars 17. A frame is thus provided which includes transversely disposed slots 18 which slidingly receive a bottom panel 19. This panel is preferably formed of sheet metal and forms the bottom of the crate and is capable of being withdrawn for the purpose of cleaning the crate, after which it may be replaced. The bottom panel 19 may be withdrawn or replaced from either end of the crate and for convenience, the spaced end bars 16 are provided with finger notches 20. Pivotally mounted, preferably spring actuated fingers 21 are provided at each end of the crate. These fingers are adapted to extend across the slots 18 and across the ends of the panel 19 to hold the latter in position, as illustrated in Figures 3 and 4 of the drawings. These fingers are provided with right angularly disposed extremities 22 which are adapted to engage the upper faces of the bars 16 so as to limit pivotal movement of the fingers in one direction.

The end walls 13 are hingedly connected to the opposite ends of the frame or bottom 10 as shown at 23 so that these end walls may fold inwardly upon the frame and are spaced sufficiently above the bottom panel 19 so that "droppings" or other matter upon this panel will not interfere with the proper folding of the walls 13. The partition wall 15 is likewise hingedly secured as shown at 24 and this partition wall is connected to one of the end walls 13 by a rod or link 25. A rod or link 26 has one of its ends pivotally connected to the partition wall 15 and its opposite end connected to toggle links 27 and one of these toggle links is pivotally connected to the frame of the bottom 10 as shown at 28 while the other toggle link is pivotally connected to the upper edge of the other end walls 13. By reason of this link connection, the end walls 13 will fold inwardly toward one another when either end wall is manually pushed inward, while a downward folding movement will also be imparted to the partition wall 15 so that this wall and the end walls 13 will lie flat upon the frame of the bottom of the crate.

The side walls 12 are hingedly secured to the opposite side edges of the bottom 10 as shown at 29, while the upper edges of these side walls are free and are adapted to engage beneath the opposite side edges of the top 11. Spaced links 30 have one of their ends pivotally secured to the side walls 12 as shown at 31 while the other ends of these links are pivotally secured along the opposite side edges of the top 11 as shown at 32. Thus, the side walls 12 may be folded inwardly upon the folded end walls as indicated in Figure 4 of the drawings. This inward folding of the side will cause the top 11 to lie flat upon said side walls. In this position, a spring actuated latch bar 33 which is carried by the frame of the bottom 10, will engage an apertured keeper plate 34 which extends downwardly from the top 11. The crate will thus be securely held in folded position, but may be quickly released by manipulating the latch bar 33 through the medium of an operating finger 35 which extends from said bar. As soon as the latch bar is released, an upward pull upon the top 11 of the crate will move the side walls 12 upwardly and outwardly into proper position beneath the top wall, whereupon pressure of the side walls and top will be relieved from the end walls and the latter will swing upward into position due to the hinges 23, which are of the spring type.

Extending from the upper edge of each of the end walls 13 is an outwardly disposed stud 36 and these studs are adapted to enter elongated openings 37 which are provided in substantially L-shaped plates 38. These plates are carried at the opposite ends of the top 11 and extend downwardly, over the upper edge of the end walls 13 and when engaged by the studs 36 will provide a connection between the top and the end walls which will resist any tendency of the crate to collapse accidentally.

The top 11 includes a sectional bar 11ª, the sections of which are connected by spring hinges 39, so that the outer sections 11ᵇ of this bar form hinged closure bars for normally closing openings in the top for the passage of the contents of the crate. The outer ends of the sections 11ᵇ of the bar 11ª are received within seats provided between spaced flanges 40 which extend upwardly from the top. If desired, suitable means may be provided for holding the sections 11ᵇ against opening. Suitable means may be also provided for locking the studs 36 in engagement with the plates 38. For example, pins (not shown) extending through openings provided in the studs, may be employed, the pins of course being removable.

The invention is susceptible of various changes in its form, proportions and minor details of contruction and the right is herein reserved to make such changes as properly fall within the scope of the appended claims.

Having described the invention what is claimed is:—

1. A collapsible crate comprising a bottom, top, side and end walls, means hingedly connecting the end walls at opposite ends of the bottom to permit said end walls to fold inwardly upon the bottom, means associating the end walls to provide simultaneous pivotal movement of said walls in opposite directions, means hingedly connecting the lower edges of the side walls to the bottom to permit the side walls to fold inwardly upon the end walls, means associating the side walls and top to provide inward pivotal movement of the side walls when the top is depressed and means to hold the walls against lateral movement to stiffen the crate when the end walls are in set up position.

2. A collapsible crate comprising a bottom, top, side and end walls, means hingedly connecting the end walls at opposite ends of the bottom to permit said end walls to fold inwardly upon the bottom, means associating the end walls to provide simultaneous pivotal movement of said walls in opposite directions, means hingedly connecting the lower edges of the side walls to the bottom to permit the side walls to fold inwardly upon the end walls, spaced links having one of their ends pivotally secured to the side walls at points spaced from the top of the latter and their other ends pivotally secured to the top to provide inward pivotal movement of the side walls when the top is depressed and reverse pivotal movement when the top is raised and means to hold the walls against lateral movement to stiffen the crate when the end walls are in set up position.

3. A collapsible crate comprising a bottom, top, side and end walls, means hingedly connecting the end walls at opposite ends of the bottom to permit said end walls to fold inwardly upon the bottom, means associating the end walls to provide simultaneous pivotal movement of said walls in opposite directions, means hingedly connecting the lower edges of the side walls to the bottom to permit the side walls to fold inwardly upon the end walls, means associating the side walls and top to provide inward pivotal movement of the side walls when the top is depressed, means to hold the walls against lateral movement to stiffen the crate when the end walls are in set up position and means to lock the crate in folded position.

4. A collapsible crate comprising a bottom, top, side and end walls, means hingedly connecting the end walls at opposite ends of the bottom to permit said end walls to fold inwardly upon the bottom, means associating the end walls to provide simultaneous pivotal movement of said walls in opposite directions, means hingedly connecting the lower edges of the side walls to the bottom to permit the side walls to fold inwardly upon the end walls, means associating the side walls and top to provide inward pivotal movement of the side walls when the top is depressed, means to hold the walls against lateral movement to stiffen the crate when the end walls are in set up position and a spring latch mounted upon the bottom and engaging a keeper carried by the top to hold the crate in folded position.

5. A collapsible crate comprising a bottom, top, side and end walls, means hingedly connecting the end walls at opposite ends of the bottom to permit said end walls to fold inwardly upon the bottom, means associating the end walls to provide simultaneous pivotal movement of said walls in opposite directions, means hingedly connecting the lower edges of the side walls to the bottom to permit the side walls to fold inwardly upon the end walls, means associating the side walls and top to provide inward pivotal movement of the side walls when the top is depressed, studs extending from the end walls and downwardly extending substantially L-shaped apertured plates carried by the top and engaged by the studs to hold the walls against lateral movement to stiffen the crate when the end walls are in set up position.

In testimony whereof I affix my signature.

JOSEPH F. WOLANIN.